United States Patent [19]

Keeler

[11] Patent Number: 5,164,823

[45] Date of Patent: Nov. 17, 1992

[54] IMAGING LIDAR SYSTEM EMPLOYING MULTIPULSE SINGLE AND MULTIPLE GATING FOR SINGLE AND STACKED FRAMES

[75] Inventor: R. Norris Keeler, McLean, Va.

[73] Assignee: Kaman Aerospace Corporation, Bloomfield, Conn.

[21] Appl. No.: 632,329

[22] Filed: Dec. 21, 1990

[51] Int. Cl.[5] .................. H04N 7/00; H04N 7/18; H04N 5/30

[52] U.S. Cl. .................... 358/95; 358/109; 358/211; 365/5

[58] Field of Search .......... 358/95, 110, 109, 211, 358/93; 365/5

[56] References Cited

U.S. PATENT DOCUMENTS

| | | | |
|---|---|---|---|
| 3,467,773 | 9/1969 | Heckman, Jr. | 358/95 |
| 3,649,124 | 3/1972 | Takaoka et al. | 358/95 |
| 3,899,250 | 8/1975 | Bamberg et al. | 358/95 |
| 3,902,803 | 9/1975 | Lego, Jr. | 358/95 |

Primary Examiner—John K. Peng
Attorney, Agent, or Firm—Fishman, Dionne & Cantor

[57] ABSTRACT

An imaging lidar system is presented which employs a multipulse multiple gating system which is particularly well suited for underwater imaging. The imaging lidar system of this invention utilizes a multipulse Q-switched laser operating within the pumping envelope of discharging flash lamps (or other means) to cumulatively illuminate a single frame on a camera (e.g., CCD camera) while the camera is gated repetitively so that each pulse is "observed" at the same depth; that is, the gated camera views that same illuminated area in the ocean. The sequence is repeated at a frequency which is both the laser pulse repetition rate and the camera frame rate. The present invention also allows the use of multiple cameras with frame addition or with frames processed separately. As a result, energy is extracted from the laser in the form of short (1-10 nsec) pulses by rapidly Q-switching during the time the laser is being pumped by the flashlamps. Provisions are made for subtracting solar noise during daylight, if necessary. The present invention thus provides a technique for extracting the maximum energy from the laser in the form of these short pulses.

29 Claims, 4 Drawing Sheets

IMAGING LIDAR SYSTEM EMPLOYING MULTIPULSE SINGLE AND MULTIPLE GATING FOR SINGLE AND STACKED FRAMES

BACKGROUND OF THE INVENTION

This invention relates generally to a sensor system for remote detection and imaging of objects in a backscattering medium such as air or water. More particularly, this invention relates to a method and apparatus for detecting, locating and/or imaging underwater objects such as mines and submarines from an airborne platform using a novel imaging lidar (light detection and ranging) system which employs a multipulse multiple camera or multiple gating of a single camera for maximizing the illumination available to the imaging lidar system.

It is desirable in a number of military and civilian applications to search a volume within a backscattering medium for the presence of certain targets. For instance, moored or bottom mines deployed in ocean shipping lanes are a hazard to navigating ships used both for military and for commercial purposes. For other civilian applications such as law enforcement on the ocean, it is desirable to detect the presence of submerged fishing nets or drug-carrying containers used in smuggling contraband. In or near harbors and beaches, it is also desirable to detect submerged obstructions, cables, pipelines, barrels, oil drums, etc. In strictly military applications, anti-submarine warfare demands an effective means of detecting and locating submarines.

Presently, cumbersome and time consuming wire line devices must be used for detecting underwater targets from remote airborne locations. These devices are lowered into the water and of course, are easily subject to damage and loss. Also, wire line devices make target searching relatively slow and can only detect targets without providing visual imaging. An important and novel system for remote detection and imaging of objects underwater (or objects obscured by other backscattering media which is at least partially transmitting to light such as ice, snow, fog dust and smoke) from an airborne platform has been described in U.S. Pat. No. 4,862,257 and U.S. patent application Ser. No. 256,778 filed Oct. 12, 1988, now U.S. Pat. No. 5,013,917, both of which are assigned to the assignee hereof and incorporated herein by reference. The imaging lidar system of U.S. Pat. No. 4,862,257 utilizes a laser to generate short pulses of light with pulse widths on the order of nanoseconds. The laser light is expanded by optics and projected down toward the surface of the water and to an object or target. U.S. Pat. No. 5,013,917 relates to an imaging lidar system intended for night vision.

Imaging lidar systems of the type described hereinabove are also disclosed in commonly assigned U.S. Pat. No. 4,964,721 and U.S. Pat. No. 4,967,270, both of which are incorporated herein by reference. U.S. Pat. No. 4,964,721 relates to a imaging lidar system which controls camera gating based on input from the aircraft onboard altimeter and uses a computer to thereby adjust total time delay so as to automatically track changing platform altitude. U.S. Pat. No. 4,967,270 relates to a lidar system employing a plurality of gated cameras which are individually triggered after preselected time delays to obtain multiple subimages laterally across a target image. These multiple subimages are then put together in a mosaic in a computer to provide a complete image of a target plane preferably using only a single light pulse.

U.S. Ser. No. 565,631 filed Aug. 10, 1990 which is also assigned to the assignee hereof relates to an airborne imaging lidar system which employs a plurality of pulsed laser transmitters, a plurality of gated and intensified array camera receivers, an optical scanner for increased field of regard, and a computer for system control, automatic target detection and display generation. U.S. Ser. No. 565,631 provides a means for rapidly searching a large volume of the backscattering medium (e.g., water) for specified targets and improves upon prior art devices in performance as a result of having more energy in each laser pulse (due to simultaneous operation of multiple lasers) and a more sensitive detection system using multiple cameras. The several cameras may be utilized to image different range gates on a single laser pulse or several cameras can be gated on at the same time to provide independent pictures which can then be averaged to reduce the noise level and improve sensitivity. Both of these improvements result in higher signal-to-noise ratio and thus higher probability of detection or greater range of depth capability.

While the imaging lidar systems described above are well suited for their intended purposes, there continues to be a need for imaging lidar systems of this type which have improved operational accuracy and efficiency in the imaging of targets enveloped by a backscattering medium, particularly underwater targets. One significant problem with known imaging lidar systems is the relatively poor use of the available laser energy. The lasers currently available as transmitters frequently are pumped over periods of several microseconds and in order to achieve maximum energy extraction are allowed to lase freely. This "free lasing" produces pulses several microseconds in length. These pulses are far too long for use with imaging lidar systems where shorter pulses are needed. As a result, imaging lidar systems of the type described above must employ Q-switching. When this is done, only a fraction of the available energy can be recovered in a single pulse, drastically decreasing the light available for illumination of the area of interest.

SUMMARY OF THE INVENTION

The above-discussed and other deficiencies and drawbacks of the prior art are overcome or alleviated by the imaging lidar systems of the present invention which employ a multipulse multiple gating system or multiple cameras which are particularly well suited for underwater imaging.

The imaging lidar system of this invention comprises a laser transmitter and gated camera receiver, or multiple cameras. More particularly, this lidar system utilizes a multipulse Q-switched laser operating within the pumping envelope of discharging flash lamps (or other means) to cumulatively illuminate a single frame on a cameras (e.g., CCD camera) while a single camera is gated repetitively so that each pulse is "observed" at the same depth; that is, the gated camera views that same illuminated area in the ocean. The sequence is repeated at a frequency which is both the laser pulse repetition rate and the camera frame rate. As a result, energy is extracted from the laser in the form of short (1–10 nsec) pulses by rapidly Q-switching during the time the laser is being pumped by the flashlamps. The present invention thus provides a technique for extracting the maximum energy from the laser in the form of these short pulses.

The present invention allows for the rapid gating of the framing cameras so that the illumination of a given volume of the ocean by a series of rapidly occurring pulses can provide a cumulative effect, thus effectively increasing the illumination available over the area of interest.

A second mode of operation is to use multiple cameras as in U.S. Pat. No. 4,967,270 either combining (adding) the frames obtained or decreasing the field of view so that the frames are not added but processed separately as in U.S. Pat. No. 4,862,257.

Typically, in the Ti-Sapphire laser, Q-switching a single (10-30 nsec) pulse out for each individual period of flashlamp discharge results in a 0.2% efficiency of energy extraction. When multiple pulses are switched out in the same flashlamp discharge cycle (in accordance with this invention), energy extraction is relatively efficient since there is much less time available between laser output pulses for the laser rod excitation to decay; and efficiency of over 2% can be achieved. This same phenomena holds true for other types of lasers where the discharge or pumping time is relatively long and the pulsing time is short.

The noise encountered at great depths in the ocean is uncorrelated. Therefore at night, with no sunlight present, use of four gates and four micropulses would increase the signal to noise ratio (S/N) by a factor of $(4)^{\frac{1}{2}}=2$. In the daytime, sunlight photocurrent exists as a constant noise source, and its presence in the signals from each micropulse and gate is highly correlated. However, the most intense solar noise source from the ocean is glint from the waves and troughs at the ocean surface. The scale of this optical noise is small; about three to six feet in length and no more than a foot or two wide at best under normal conditions. The second source is the integrated upwelling from the light backscattered from the ocean depth. These two sources of noise are greatly reduced by use of an interference filter, but the acceptance bandwidth of such filters is limited to only about 2-3 nm. Nevertheless, the use of such filters in the presence of sunlight eliminates a great deal of the solar noise. The presence of glint and focussing and defocussing of sunlight from surface wave action creates a "patchy" noise field an its effect on target detection depends, of course, on the size and number of targets imaged. The reason for the high degree of correlation for this kind of noise in this embodiment is that the time frame for these artifacts of solar noise are determined by wave action. During the gating time of several microseconds, they are "frozen". Significant changes in the ocean surface which normally occur in time scales from 0.1 to 10 seconds are too slow to register in these very short frame intervals.

Another source of solar noise is the reflection of the downwelling solar radiation from surfaces such as highly reflective sandy bottoms. This noise is mostly decorrelated.

The correlated noise sources of solar photocurrent can be minimized by opening the camera gate a short time before (or after) discharging the laser transmitter for a gate equal in time to the product of the number of micropulse-gate events and the gate of each of these events. Thus, if there are four micropulses and four multiple gates of 20 ns duration, the camera is left open initially (or subsequently) for 80 ns. Then, following the procedure described in U.S. Pat. No. 5,034,810 (which is assigned to the assignee hereof, the signal thus obtained is stored, and substracted from the signals accumulated on the CCD array. In this way the effects of correlated noise are eliminated.

The same technique can be applied to imaging different gates as described in U.S. Pat. No. 4,862,257. In this arrangement, the target is imaged in reflection; then the gate is set immediately below the target (i.e., the boundary) and the target is imaged in obscuration. The obscured target frame is then subtracted from the reflected target frame. This subtraction leaves the reflection from the target but subtracts backscattering and correlated noise. This technique requires imaging at two different depths, and camera gain adjustment errors are possible.

Finally, it is possible to use two color subtraction techniques. As has been disclosed in U.S. Pat. No. 5,034,810, this technique works only when the scattering properties of the target and surrounding medium have spectral dependence. Using this process, it may be necessary to match the two wavelengths to opposite sides of the Jerlov curve so that downward attenuation of the two wavelengths is approximately equal; and the spectral dependence of light reflectivity at the surface should also be considered. Completely subtracting out the correlated solar photocurrent requires dependence (which is small). This is combined with the two depth technique. Since the wavelength dependence of the target and backscatter intensity is different, the subtraction processes will leave a residual image. This represents still another embodiment of the invention.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

In general and with reference to U.S. Pat. Nos. 4,862,257 and 4,964,721, 4,967,270 and U.S. Ser. No. 565,631, imaging lidar systems comprise at least one pulsed light transmitter (e.g., laser) which is associated with at least one gated receiver (e.g., CCD camera). The transmitter transmits pulsed light through a backscattering medium (e.g., water) toward an object or target. Light reflected or backscattered from the target is then imaged by the gated receiver.

In accordance with the present invention, energy is extracted from the laser (transmitter) in a series of Q-switched pulses separated in time by some 1-2 microsec. At the departure of each laser pulse, the camera gate is set, so that the camera views the reflected or backscattered light from each pulse as it passes through the same volume. Since the time scale of these processes is much shorter than the time scale of motion associated with the ocean and targets, the area observed is essentially "frozen" during its illumination by the series of Q-switched pulses. The microsecond pulse separation allows the scattered and reflected light from the preceding pulse to dissipate before the camera is gated again, and for the gating associated with the imaging of the area illuminated by the preceding pulse to be complete (i.e., gate closed) before the following pulse is transmitted. The photoelectrons generated during this process then accumulate on the CCD imager (receiver). When the laser is discharged and all the Q-switched pulses have been transmitted, the CCD then transfers its discrete charges sequentially to a transmission line where they are "read out" and assembled on a video screen. In a multiple camera configuration of FIG. 4, each separate camera gates in synchronization as a given pulse enters the volume to be imaged. Other embodiments are possible in which separate cameras could image different depths for different pulses, but imaging indifferent depths could also be done with several cameras and one pulse. Likewise, several regions could be imaged by multiply gated cameras, but this simply requires a straightforward implementation of the first embodiment using two or more cameras. It should be noted that since the train of Q-switched pulses appear some 1-2 microsecond apart, it is not practical to change the direction of the laser beam during a series of such pulses.

Figure 1:
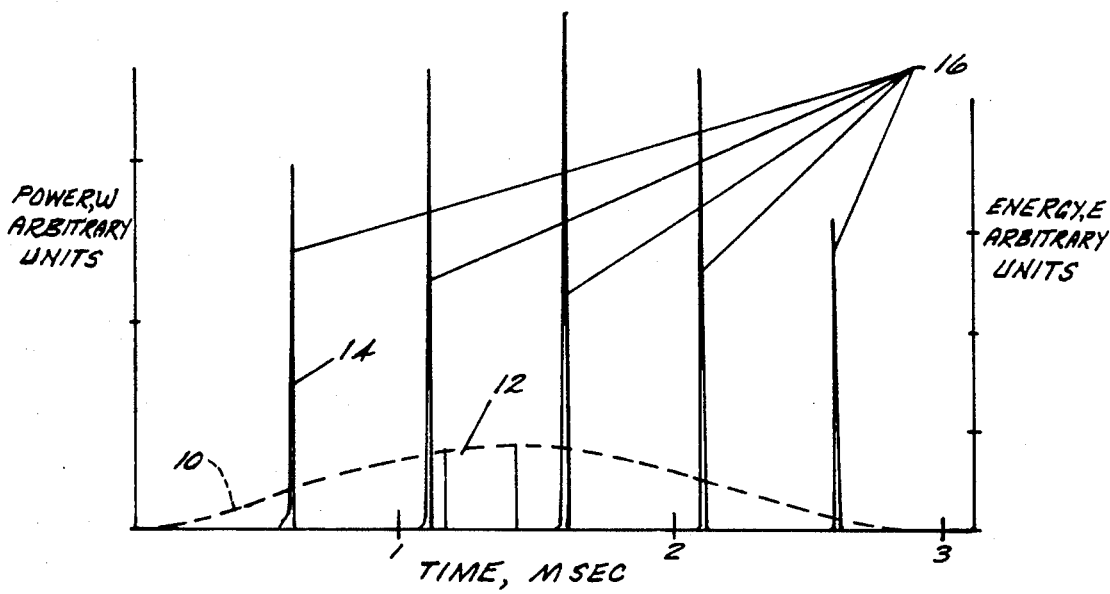
FIG. 1 is a graph depicting the output of a laser during both free lasing and Q-switched mode.

Referring now to FIG. 1, the power/energy output is shown for a typical laser (such as Titanium Sapphire) in the free lasing and Q-switched mode, with peak power P and pulse energy E being plotted against time. The ordinates, P,E are not to scale and are for illustration purposes only, except that the peak power of the Q-switched pulses is orders of magnitude greater than the peak power of the free lasing pulse. The free lasing curve 10, rises gently over a period of a few microseconds, and then subsides. Energy transfer into the emitted light is optimized but pulses too lengthy for presently known imaging lidar systems are generated. Also, for such a long pulse, there is a competition between the lasing and other radiative decay processes, restricting the energy which can be extracted as light over a relatively long time period. The effects of pulse slicing or pulse chopping are shown as the shaded area 12, where the pulse of maximum practical length for this application is some 250 nsec. The shaded area represents the illumination available for the area to be imaged. It can be seen that not only is the available energy drastically reduced from that of the free lasing pulse, but in addition, the relatively low power of the pulse increases the effect of outside noise such as sunlight.

A single Q-switched pulse 14 is also shown (in FIG. 1). It can be seen that energy extraction for the period of time the laser has been pumped is relatively efficient. However, although the peak power is high, the pulse energy extraction is only a fraction of the energy of the free laser pulse. A train of Q-switched pulses 16 is also shown in FIG. 1, starting with the single pulse 14. These pulses in aggregate provide a more efficient overall energy extraction than the free lasing pulse 10 by perhaps as much as 50%. Their high peak power provides for better illumination of the area to be imaged against the sun and other external noise sources.

Figure 2A:
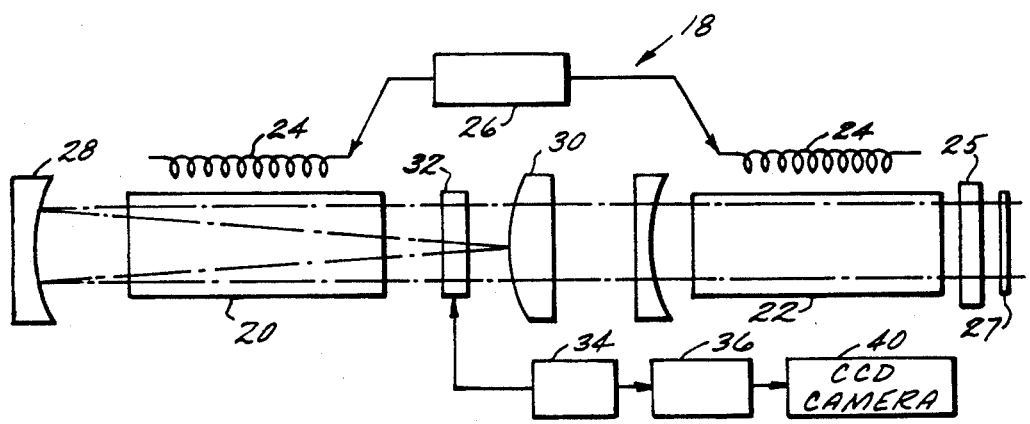
FIG. 2A is a schematic side elevation view of a laser transmitter for use in the imaging lidar system of the present invention.

Referring to FIG. 2A, a master oscillator and power amplifier operating in the Q-switched mode is shown for a pulsed laser transmitter 18 in accordance with the present invention. (This is commonly called the "MOPA" arrangement). Transmitter 18 includes a laser master oscillator rod 20 and power amplifier rod 22 which are pumped by flashlamps 24 and harmonic generator 25 adjacent the exit port 27. The flashlamps 24 are pulsed by a power supply output 26 which has the desired voltage and kva rating for the flashlamps. The master oscillator cavity is bounded by a rear reflector mirror 28 which is concave to compensate for thermal lensing, and an output coupler 30. A Pockels Cell Q-switch 32 is activated by a trigger pulse input 34 which initiates the formation of the desired number of short Q-switched pulses. This input trigger 34 is linked to a gate trigger 36, which provides for a gate which corresponds to the depth to be imaged. The gating is timed to synchronize with the transmission of the Q-switched pulses, so that the camera images the same illuminated area during the passage of each transmitted light pulse through the ocean.

Figure 2B:
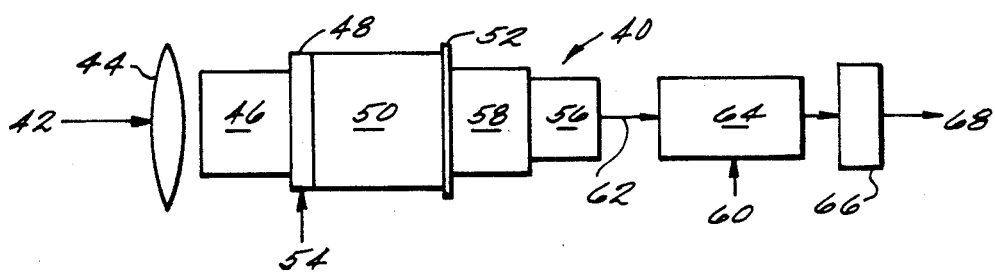
FIG. 2B is a schematic side elevation view of a gated camera receiver for use in the imaging lidar system of the present invention.

Referring now to FIG. 2B, a CCD imaging camera in accordance with the present invention is shown generally at 40. Light 42 is shown entering camera 40 through a collecting lens 44 and fiber optics 46 arriving at a photocathode 48. The electrons produced at photocathode 48 are then accelerated through a microchannel plate 50 and impact on a phosphor plate 52. The time during which this process is allowed to occur is determined by the gating pulse 54. The light generated at phosphor 52 is then transmitted to a CCD array 56, through a fiber optic bundle 58. Each element in the CCD array is a "pixel" or unit of the image area. The CCD is drained of its charge as a result of a signal transmitted thereto and known as the transfer pulse 60. This pulse is synchronized to the discharge of the flashlamps as in prior lidar systems (e.g., see Pat. No. 4,862,257), but is generated subsequent to the insertion of a delay after each Q-switched pulse. Hence, the delay between transmission of each Q-switched laser pulse in a given pulse train and the camera gate will be constant. The CCD array is drained after each separate train of Q-switched pulses allowing the CCD time to collect charge which represents multiple illumination of the area to be imaged. Signals from CCD 56 are transmitted along transmission line 62 to transmission line readout 64 and then to video screen 66 and, if desired, to recorders or the like 68.

Figure 3:
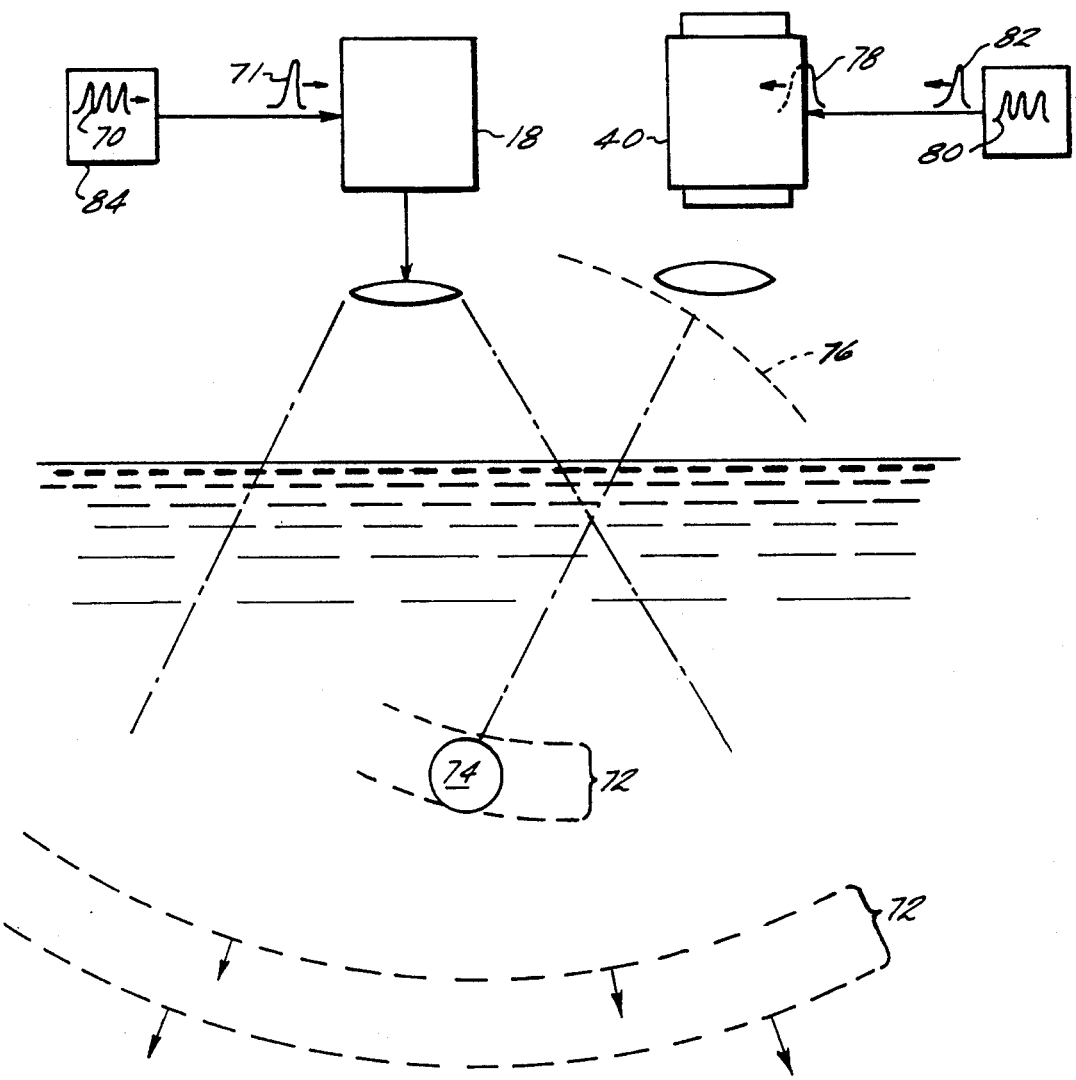
FIG. 3 is a schematic view of the single camera imaging lidar system of this invention imaging an object submerged under the water.

Referring to FIG. 3, a schematic of a complete lidar system incorporating both laser 18 and camera 40 is shown. In this system, a train of Q-switched pulses is emitted from laser transmitter 18. FIG. 3 represents a time when the first of five pulses (three of the four remaining pulses being identified at 70 and the fourth pulse at 71) has passed the volume to be imaged, 72 and a target 74 within volume 72 is arriving at camera 40 coinciding with the gating signal 78 arrival at the camera. Three gating signals 80 remain to be transmitted, and one signal 82 is in transmission. The trigger pulse 71 for the Q-switch is also arriving at the laser transmitter 10 to allow the second pulse in the train of five Q-switched pulses to be transmitted shortly after closure of the camera gate. The first pulse has already triggered the Q-switch, causing a laser pulse to be released. The pulse generator 84 has three pulses 70 of the five total Q-switched pulses remaining. When the fifth Q-switched laser pulse is transmitted and the camera is gated a fifth consecutive time, no further gating signals will be transmitted until the power supply starts the five pulse cycle again by electrically pumping the flash lamps 24 (see FIG. 2A). On the following cycle, the transmission of the first pulse to the Q-switch then activates the gating circuitry as before, although in the new cycle, a different gate can be set for the camera, so that a different depth can be imaged. It should be noted that the presence of pulses in the pulse generator 84 and at the beginning of the transmission line 86 are for the purpose of illustration only, to represent a given number of pulses or signals which will be (and have not yet been) transmitted in the course of generating the Q-switched pulse train, and the corresponding gating signals.

Figure 4:
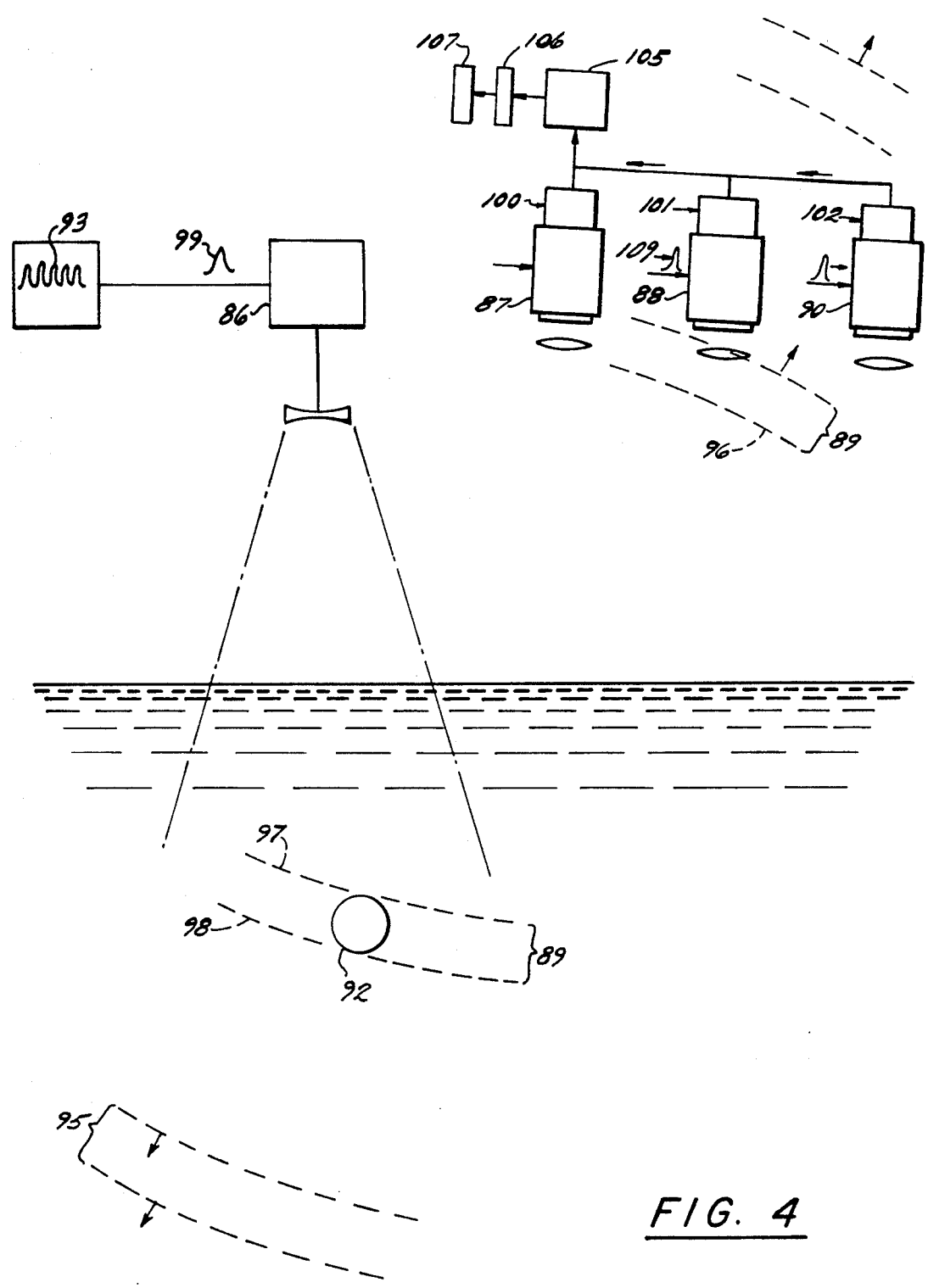
FIG. 4 is a schematic view of the multiple camera imaging lidar system of this invention imaging the same underwater volume with addition of frames.

Referring to FIG. 4, a schematic is shown of a complete lidar system incorporating a laser transmitter 86 and multiple cameras 87, 88 and 90. For the purposes of illustration, only three cameras are shown, but as many cameras as practical could be used. In this system, as in FIG. 3, a train of Q-switched pulses 93 is emitted from laser transmitter 86. FIG. 4 represents a time when the first pulse 95 of a train of pulses has been emitted, has illuminated a target, reflected back to camera 87 and been imaged at 100, and stored for release to a computer 105. The second pulse 96 in the train can still be seen; it is entering camera 88, which is gated by signal 109 to receive the second pulse illumination of volume 89, and target 92. More pulses triggered by signals 93 remain to be transmitted. The gating signal to trigger camera 87 has been transmitted and received; the image of the first pulse 95 illumination of volume 89 is now stored in camera 87 at 100. The reflection from volume 89 as illuminated by the second pulse 96 is entering camera 88, as the gate of that camera is now open to receive the signal and create the image of volume 89. It should be noted that reflection from the transmitted light pulse train is, in fact, continuous; the boundary lines 97 and 98 simply represent the extent and location of the region illuminated by the light pulse as determined by the timing and width of the camera gate setting. The camera gates are set so that this region is the same for all pulses and for all cameras, each imaging the illumination of volume 89 by a single Q-switched transmitted laser pulse. The trigger pulse 99 is arriving at the laser transmitter 86 to allow the third pulse to be emitted. The illumination of the volume 89 by that pulse will be imaged by a third camera 90. Subsequent images can be registered on additional cameras in the same manner. When all the images 100, 101, 102 are stored they are released and transmitted to a computer 105. Here they are added and transmitted to storage 106 or to a video display 107. It is evident that an image has been created which has an enhanced signal to noise ratio compared with the single pulse singly gated configuration of the prior art.

In certain daytime applications, solar noise may be problematic. The following are several methods for removing such noise.

In a method which provides for the minimization of correlated solar noise, the camera is gated with n gates $\Delta \tau$ ns in duration, with each gate corresponding to the transmission of a laser micropulse. When all the micropulses have been emitted from the transmitter, ocean backscatter, and/or target reflection and obscuration are recorded and stored on the camera CCD arrays and subsequently released by the transfer pulse. Upon release, the accumulated charges are stored on the video register. Following this event, the camera is gated open for a final gate exposure of n $\Delta \tau$ ns, where n is the number of micropulses imaged and, $\Delta \tau$ is the gate duration corresponding to the imaging of the return from the micropulses. The procedure disclosed in U.S. Pat. No. 5,034,810 is then followed. This pulse is then inverted in polarity and "added" to the sums of the previously imaged micropulse returns resting in optical storage. In still another technique for reducing solar noise, the initial pulse images the target in reflection; the following pulse, images at a level just below the first image. In this case, the target is imaged in "shadow", or obscuration. The second image is subtracted from the first, and the target reflection remains, while the surrounding backscatter is minimized, "highlighting" the target reflection. This technique is described in detail in U.S. Pat. No. 4,862,257.

Finally, in still another procedure for eliminating solar noise, the procedures described in U.S. Pat. No. 5,034,810 are applied to sunlight rejection. In this embodiment, two micropulses from the same macropulse are shifted in frequency by an electro-optic tuner in the oscillator cavity or in an external resonant cavity coupled to the oscillator cavity. These two pulses are then transmitted out, imaged and received through a two wavelength narrow band filter. The images are subtracted, with a weighting factor applied to eliminate correlated solar noise. The image of the target in obscuration or shadow remains.

Figure 5A:
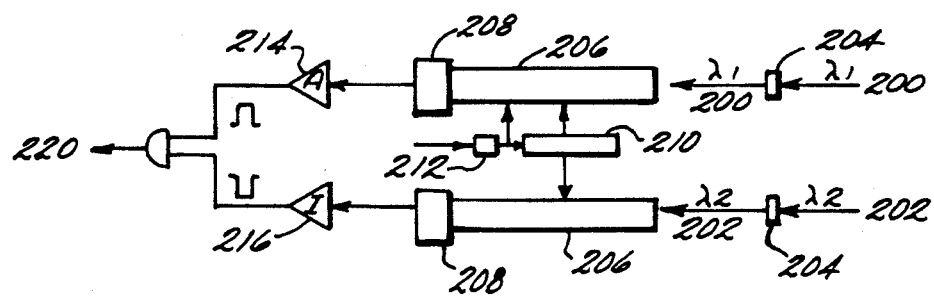
FIGS. 5a and 5b are schematic views showing the hardware for image substraction in respective multicamera and single camera imaging lidar systems.

The noise subtraction techniques of U.S. Pat. No. 4,034,810 are as follows, with reference to FIGS. 5a (a multicamera system) and 5b (a single camera system). Referring now to FIG. 5a the returning backscattered pulses 200 and 202 pass through the collection optics and narrow band pass filters 204. Since there are two separate CCD cameras, separate optics are used with two separate single wavelength narrow bandpass filters passing the wavelengths $\lambda_1$ and $\lambda_2$. The light pulses pass through the image intensifiers 206 and to the CCD detectors 208. In order to null out noise, the capability of controlling the high voltage power supply 210 through a balancing element 212 is added. The CCD output from the arrival of pulse 200 is fed to the amplifier 214; the output from the arrival of pulse 202 is fed to inverting amplifier 216. Since pulse 200 arrived microseconds before pulse 202, the readout of the CCD camera feeding amplifier 214 must be delayed by an amount equal to the spacing between the two pulses so that the readouts may arrive at the diode 218 at precisely the same time. Subtraction is accomplished at diode 218 and the output sent to a display or storage 220.

Figure 5B:
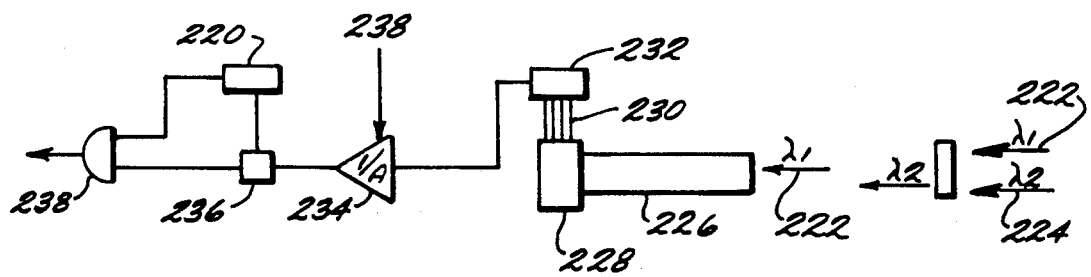

Referring to FIG. 5b, the returning backscattered pulses 222 and 224 originate from two different lasers and are separated in time by some 100 microseconds. Pulse 222 enters the image intensifier 226 and registers on the CCD detectors 228. These arrays are normally read off in rows by columns serially and typical recovery times are of the order of 10–20 milliseconds. In this case, the CCD array is read off by rows in parallel on separate leads 230 stored and retransmitted at 232 and then passed through the amplifier/inverting amplifier 234. This process can take place in times as short as 30 microseconds and in this case a recovery time of 100 microseconds is assumed allowing the CCD camera to receive pulse 224 some 100 microsecond after the receipt of pulse 222. The storage and retransmission unit 232 takes the parallel outputs 230 and restores them to series format transmitting them through the amplifier-/inverting amplifier 228 operating in the amplifier mode. When the switch 236 senses a positive voltage, it stores the series form pulse 222 at the arrival of pulse 224, the function command signal 238 configured as an inverter amplifier. Upon sensing the negative signal, the switch 236 passes the series train of pulse 224 and triggers the release by 220 of the stored or delayed pulse 222 data. The two pulse data trains then enter the diode 238 simultaneously and are added (subtracted).

It will be appreciated that lidar systems of this invention may employ any number of lasers as well as any desired number of camera-receivers with associated amplitude controls and timing schemes. The transmitter laser disclosed herein is a titanium sapphire laser frequency doubled for transmission in the blue region of the visible optical spectrum (440-480 nm) for improved transmission in deep ocean waters. The present invention is well suited however, for any laser and lidar system where the energy cannot readily be extracted as a short, high energy pulse because of the length of the flashlamp pumping time.

It should be evident from the above description that a lidar imaging system has been described with improved ability to image undersea targets, and provide a better signal-to-noise ratio and probability of detection.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for detecting and imaging an object enveloped by a backscattering medium which is at least partially transmitting to light including the steps of:
   repeatedly generating short pulses of light from a laser at a preselected laser pulse rate, said pulses being repeatedly generated in a single pump cycle of said laser;
   projecting said repeatedly generated short pulses of light toward the backscattering medium and at an object enveloped by the backscattering medium;
   detecting said pulses of light reflected back from said object using a gated camera, said gated camera being repeatedly gated at a preselected gating rate which is equal to said preselected laser pulse rate wherein said camera will view each reflected laser pulse at substantially the same depth;
   accumulating at least some of said detected pulses of light on a single camera frame; and
   converting said accumulated detected pulses of light to a video image of said object.

2. The method of claim 1 wherein:
   said preselected rate comprises between 1-2 microsecond.

3. The method of claim 1 wherein said laser includes flashlamp discharging means and wherein said pulses are generated by a Q-switch and including the step of:
   repeatedly Q-switching within a pumping envelope of said flash lamp discharging means.

4. A method for detecting and imaging an object enveloped by a backscattering medium which is at least partially transmitting to light, the method employing an imaging lidar apparatus including light pulse generating means and reflected light pulse detection means for detecting backscattered reflection, the light pulse generating means comprising a laser having a plurality of pumping cycles and further including the step of:
   repeatedly generating short pulses of light in a single pumping cycle so as to increase the energy extracted from the laser.

5. The method of claim 4 including the step of:
   repeatedly gating the light pulse detection means in synchronization with the generated pulses of light.

6. The method of claim 5 wherein said light pulse detection means comprises gated camera and including the step of:
   accumulating at least some of the detected pulses of light from the single pumping cycle onto a single camera frame of said camera so as to increase illumination of the object.

7. The method of claim 4 wherein said laser includes flashlamp discharging means and wherein said pulses are generated by a Q-switch and including the step of:
   repeatedly Q-switching within the pumping envelope of said flash lamp discharging means.

8. The method of claim 4 wherein said short pulses of light are repeatedly generated at a preselected rate and wherein:
   said preselected rate comprises between 1-2 microsecond.

9. The method of claim 6 wherein said gated camera is repeatedly gated for a preselected time period and including the step of:
   gating said gated camera for said preselected time period prior to or subsequent to said step of repeatedly generating short pulses of light wherein a noise signal is obtained;
   storing said noise signal; and
   subtracting said noise signal from said accumulated detected pulses of light to reduce solar noise.

10. The method of claim 6 wherein said gated camera is gated at two different depths to define a first accumulated image of the object in reflection and a second accumulated image of the object in obscuration and including the step of:
    subtracting said first and second accumulated images to reduce solar noise.

11. The method of claim 6 wherein each of said short pulses of light are separated into a first micropulse having a first wavelength and a second micropulse having a second wavelength, said first and second wavelengths being mutually distinct and including the step of:
    obtaining a first accumulated image at said first wavelength;
    obtaining a second accumulated image at said second wavelength; and
    subtracting said first and second accumulated images.

12. An apparatus for detecting and imaging an object enveloped by a backscattering medium which is at least partially transmitting to light including the steps of:
    laser means for repeatedly generating short pulses of light at a preselected laser pulse rate, said pulses being repeatedly generated in a single pump cycle of said laser means;
    means for projecting said repeatedly generated short pulses of light toward the backscattering medium and at said object enveloped by the backscattering medium;
    gated camera means for detecting said pulses of light reflected back from said object after, said gated camera means being repeatedly gated at a preselected gating rate which is equal to said preselected laser pulse rate wherein said camera means will view each reflected laser pulse at substantially the same depth;

means for accumulating at least some of said detected pulses of light on a single camera frame; and means for converting said accumulated detected pulses of light to a video image of said object.

13. The apparatus of claim 12 wherein:
said preselected rate comprises between 1-2 microsecond.

14. The apparatus of claim 13 wherein said laser means includes flashlamp discharging means and wherein said pulses are generated by a Q-switch and including:
means for repeatedly Q-switching within a pumping envelope of said flash lamp discharging means.

15. An imaging lidar system for detecting and imaging an object enveloped by a backscattering medium which is at least partially transmitting to light, the imaging lidar system including light pulse generating means and reflected light pulse detection means for detecting backscattered reflection, the light pulse generating means comprising a laser having a plurality of pumping cycles and further including:
means for repeatedly generating short pulses of light in a single pumping cycle so as to increase the energy extracted from the laser.

16. The apparatus of claim 15 including:
means for repeatedly gating the light pulses detection means in synchronization with the generated pulses of light.

17. The apparatus of claim 15 wherein said light pulse detection means comprises a camera and including:
means for accumulating at least some of the detected pulses of light from said single pumping cycle onto a single camera frame of said camera so as to increase illumination of the object.

18. The apparatus of claim 15 wherein said reflected light pulse detection means comprises gated camera means and wherein said gated camera means is repeatedly gated for a preselected time period and including:
means for gating said camera means for said preselected time period prior to or subsequent to repeatedly generating short pulses of light wherein a noise signal is obtained;

means for storing said noise signal; and means for subtracting said noise signal from said accumulated detected pulses of light to reduce solar noise.

19. The apparatus of claim 15 wherein said reflected light pulse detection means comprises gated camera means and wherein said gated camera means is gated at two different depths to define a first accumulated image of the object in reflection and a second accumulated image of the object in obscuration and including:
means for substracting said firs and second accumulated images to reduce solar noise.

20. The apparatus of claim 15 wherein each of said short pulses of light are separated into a first micropulse having a first wavelength and a second micropulse having a second wavelength, said first and second wavelengths being mutually distinct and including:
means for obtaining a first accumulated image at said first wavelength;

means for obtaining a second accumulated image at said second wavelength; and means for subtracting said first and second accumulated images.

21. The apparatus of claim 15 wherein said laser means includes flashlamp discharging means and wherein said pulses are generated by a Q-switch and including:
means for repeatedly Q-switching within a pumping envelope of said flashlamp discharging means.

22. The apparatus of claim 15 wherein said short pulses of light are repeatedly generated at a preselected rate and wherein:
said preselected rate comprises between 1-2 microsecond.

23. A method for detecting and imaging an object enveloped by a backscattering medium which is at least partially transmitting to light including the steps of:
repeatedly generating short pulses of light from a laser at a preselected laser pulse rate, said pulses being repeatedly generated in a single pump cycle of said laser;

projecting said repeatedly generated short pulses of light toward the backscattering medium and at an object enveloped by the backscattering medium;

detecting said pulses of light reflected back from said object using a plurality of gated cameras, said gated cameras being synchronously gated at a preselected gating rate which is equal to said preselected laser pulse rate wherein at least one of said cameras will respectively view each reflected laser pulse at substantially the same depth;

accumulating at least some of said detected pulses of light from each of said gated cameras; and converting said accumulated detected pulses of light from said gated cameras to a video image of said object.

24. A method for detecting and imaging an object enveloped by a backscattering medium which is at least partially transmitting to light, the method employing an imaging lidar apparatus including light pulse generating means and a plurality of discrete reflected light pulse detection means for detecting backscattered reflection, the light pulse generating means comprising a laser having a plurality of pumping cycles and further including the step of:
repeatedly generating short pulses of light in a single pumping cycle so as to increase the energy extracted from the laser.

25. The method of claim 24 including the step of:
repeatedly gating the plurality of light pulse detection means in synchronization with the generated pulses of light.

26. The method of claim 25 wherein each of said light pulse detection means comprises a gated camera and including the step of:
accumulating at least some of the detected pulses of light from each of said gated cameras so as to increase illumination of the object, 27. An imaging lidar system for detecting and imaging an object enveloped by a backscattering medium which is at least partially transmitting to light, the imaging lidar system including light pulse generating means and a plurality of discrete reflected light pulse detection means for detecting backscattered reflection, the light pulse generating means comprising a laser having a plurality of pumping cycles and further including:
means for repeatedly generating short pulses of light in a single pumping cycle so as to increase the energy extracted from the laser.

28. The apparatus of claim 27 including:
means for repeatedly gating the plurality of light pulses detection means in synchronization with the generated pulses of light.

29. The apparatus of claim 28 wherein each of said light pulse detection means comprises a gated camera and including:
means for accumulating at least some of the detected pulses of light from each of said gated cameras so as to increase illumination of the object.

* * * * *